(12) United States Patent
Osterlanger et al.

(10) Patent No.: US 7,628,088 B2
(45) Date of Patent: Dec. 8, 2009

(54) BALL SCREW MECHANISM

(75) Inventors: Jurgen Osterlanger, Emskirchen (DE);
Dieter Adler, Herzogenaurach (DE);
Manfred Kraus, Herzogenaurach (DE);
Ralf Mayer, Herzogenaurach (DE)

(73) Assignee: Ina-Schaeffler KG, Herzogenaurach (DE)

( * ) Notice: Subject to any disclaimer, the term of this patent is extended or adjusted under 35 U.S.C. 154(b) by 627 days.

(21) Appl. No.: 11/208,070

(22) Filed: Aug. 19, 2005

(65) Prior Publication Data
US 2006/0037419 A1 Feb. 23, 2006

(30) Foreign Application Priority Data
Aug. 20, 2004 (DE) .................. 10 2004 040 360

(51) Int. Cl.
*F16H 27/02* (2006.01)
*F16H 29/02* (2006.01)
*F16C 13/00* (2006.01)

(52) U.S. Cl. .................. 74/89.33; 74/89.23; 74/424.81; 384/544

(58) Field of Classification Search .............. 74/89.23, 74/89.33, 89.34, 424.81, 424.71, 424.82, 74/421 R, 89.16, 89.2; 384/537, 544, 456, 384/490
See application file for complete search history.

(56) References Cited

U.S. PATENT DOCUMENTS

| 2,530,665 | A | * | 11/1950 | Searles .................. 384/547 |
| 3,367,201 | A | * | 2/1968 | Orner .................. 74/424.86 |
| 6,378,646 | B1 | * | 4/2002 | Bugosh .................. 180/444 |
| 6,406,188 | B1 | * | 6/2002 | Lin et al. .................. 384/504 |
| 2003/0104890 | A1 | * | 6/2003 | Ochiai .................. 474/199 |
| 2005/0253230 | A1 | * | 11/2005 | Punzalan et al. .......... 257/678 |

FOREIGN PATENT DOCUMENTS

| DE | 3711099 C2 | 10/1988 |
| DE | 100 16 197 A1 | 10/2000 |
| DE | 102 58 826 A1 | 7/2004 |
| EP | 1 270 370 A2 | 1/2003 |

* cited by examiner

*Primary Examiner*—Thomas R Hannon
*Assistant Examiner*—Justin Krause
(74) *Attorney, Agent, or Firm*—Lucas & Mercanti, LLP

(57) ABSTRACT

The ball screw mechanism has spindle nut (1) arranged rotatably on a ball-rolling spindle (2) and between which balls (3) roll on ball grooves (4, 5). A driving wheel (20, 26) is fixed to the spindle nut (1), for driving the spindle nut. (1)The spindle nut (1) is mounted on a housing (8) by a rolling bearing (7). The bearing has an outer ring (9, 23) fixed to the housing (8) the outer ring (9, 23) has a ring (15, 29) surrounding the spindle nut (1), and a bearing running surface (10, 11) formed on the inner circumference of said the ring A radial flange (16, 28), adjoining the ring (15, 29), is fixed to the housing (8).

11 Claims, 2 Drawing Sheets

Figure 4:
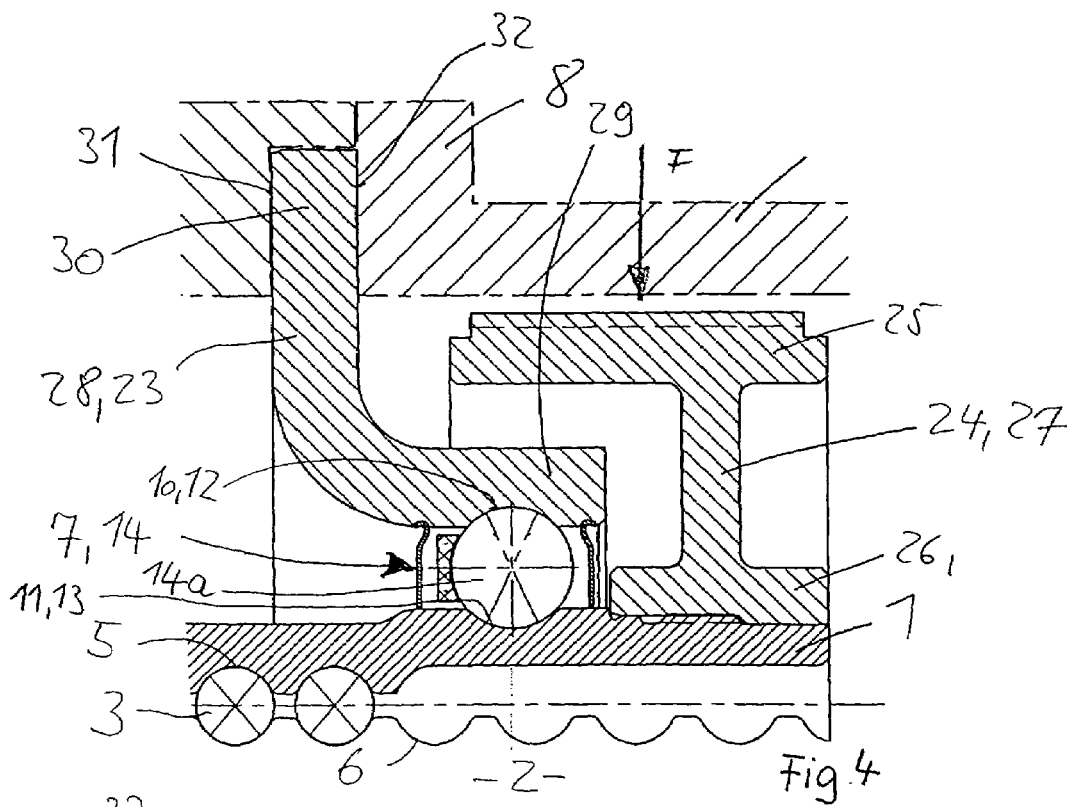

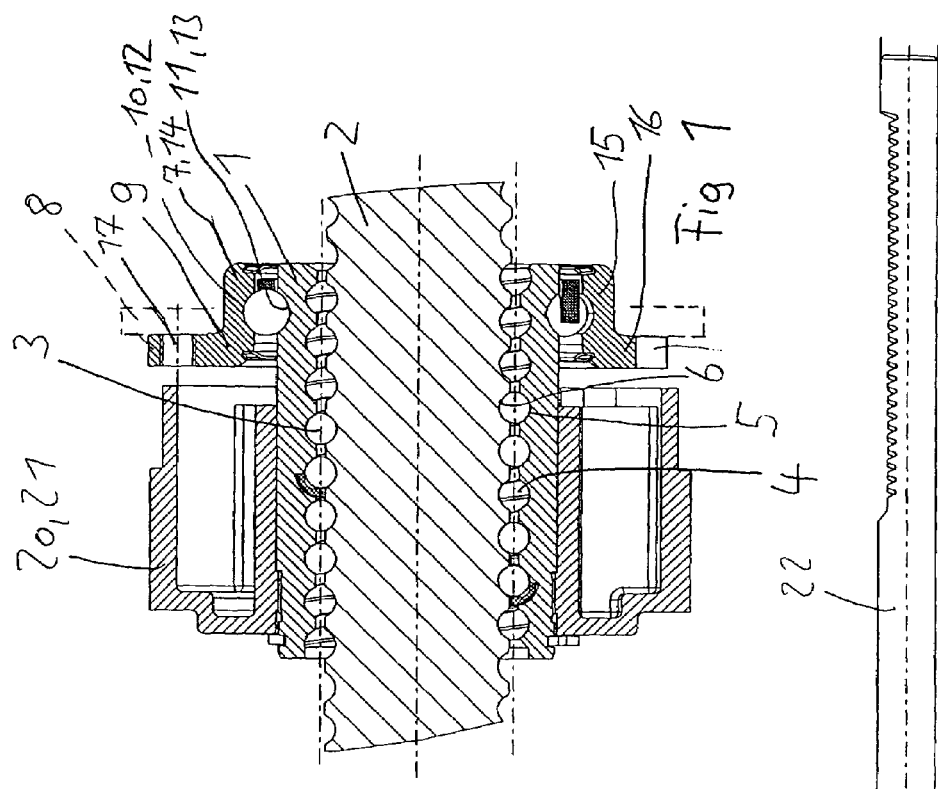
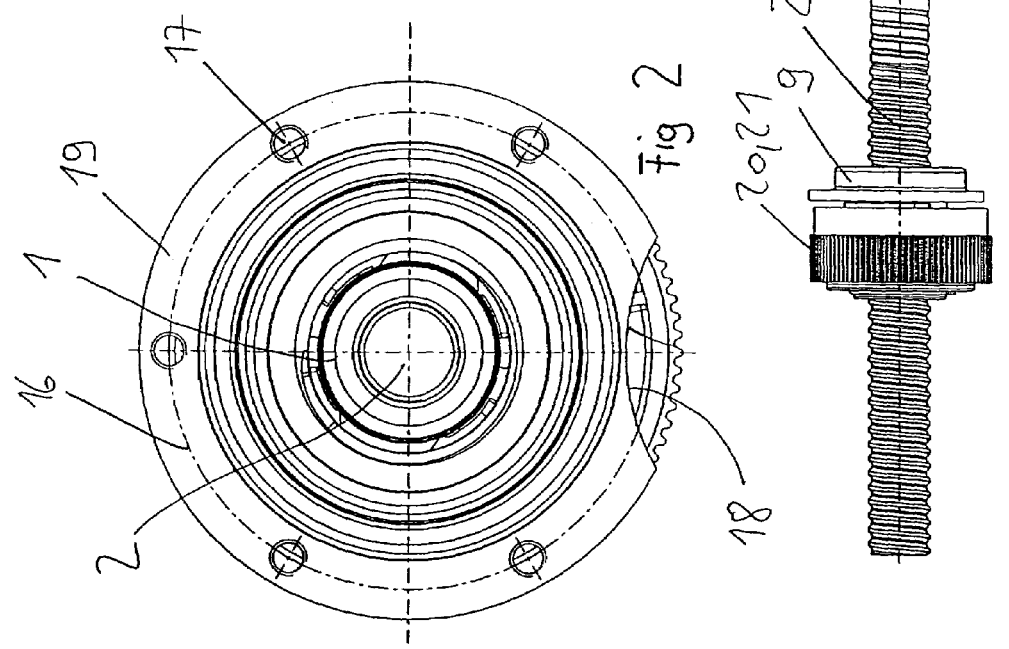
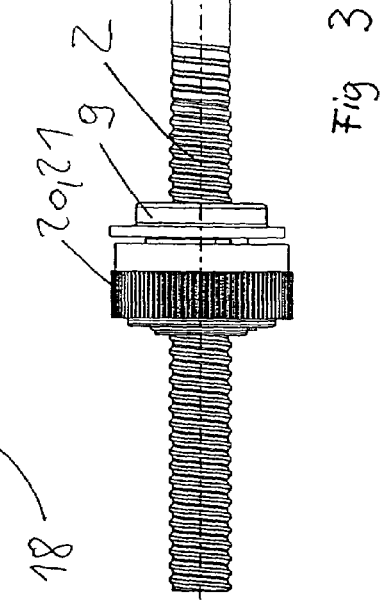

BALL SCREW MECHANISM

FIELD OF THE INVENTION

The present invention relates to a ball screw mechanism. Ball screw mechanisms are rot/trans mechanisms which convert a rotational movement into a translational movement, or vice versa. Ball screw mechanisms of this type are also used increasingly in the motor vehicle sector, for example as a component of steering assistance for a rack-and-pinion steering system. In this case, an electromotive drive is provided, the ball screw mechanism driven by the motor assisting a translational movement of the rack.

DE 102 58 826 A1, for example, disclosed a drive device with a rolling-body screw mechanism, in whose housing divided transversely to the axis of rotation into two housing parts a hollow rotor is arranged and is mounted rotatably by means of a rolling mounting. A ball-rolling spindle of the rolling-body screw mechanism is led through the rotor. The rolling mounting is provided on the housing. The outer ring of the rolling bearing is provided on its inner circumference with two ball grooves. Ball grooves are likewise formed on the spindle nut. Balls roll on the ball grooves of the spindle nut and of the outer ring. In drive devices of this type, the rolling mounting of the spindle nut transmits high axial forces. The outer ring of the rolling bearing therefore has to be secured against axial displacement. In the present case, this is achieved by means of a structural measure, in which an axial disc bears with one end face both against the end face of the outer ring and against an end-face housing wall of the housing and with its other end face against a supporting sleeve likewise supported on the housing. The mounting of this ball screw mechanism into the housing is consequently highly complicated.

The object of the present invention is to specify a ball screw mechanism according to the features of the precharacterizing clause of claim 1, which is simple to mount.

This object is achieved, according to the invention, in that the outer ring has a ring surrounding the spindle nut, and with a bearing running surface formed on the inner circumference of the said ring, and a radial flange adjoining the ring, the radial flange being capable of being fixed to the housing. In the ball screw mechanism according to the invention, the number of parts required for axial fixing is reduced considerably. According to the invention, only a single component may be sufficient to ensure the desired axial securing of the outer ring.

Preferably, the outer ring has an L-shaped form, as seen in longitudinal section, the radial flange adjoining an axial end of the ring. The radial flange and the ring may be welded to one another. It is expedient and advantageous, however, if the radial flange is integrally formed in one piece onto the ring. This can be implemented in an economical way in a forming method, in particular by deep drawing on a sheet-metal part. The radial flange is preferably arranged so as to be offset axially with respect to the bearing running surface. This may afford the advantage that, although the radial flange is arranged so as to be axially adjacent to the driving wheel, the ring of the outer ring can nevertheless be arranged with its bearing running surface within the driving wheel. If, for example, the ball screw mechanism is driven by means of a traction mechanism, for example, a toothed belt loops around a toothed disc forming the driving wheel. The radial force component of the traction mechanism which is thereby introduced into the driving wheel can then be introduced without high leverage on account of the nested arrangement of the driving wheel and of the ring of the outer ring. Tilting moments are markedly reduced. Preferably, the bearing running surface is arranged in a common plane with the radial force component from the traction mechanism. No tilting moments at all arise in this case.

In a further aspect according to the invention, the radial flange has an outside diameter which is larger than the outside diameter of the driving wheel. If, for example, the housing is divided transversely to the spindle axis and has an orifice with a diameter which is provided for receiving the driving wheel, the radial flange can be dimensioned such that on the end face it comes to bear with its edge against a housing flange. Then, for example, the other housing half can be put in place, this edge of the radial flange then being clamped between these two housing halves. On the one hand, this ensures that the outer ring, and therefore also the spindle nut, is fixed satisfactorily in the axial direction. This occurs particularly when the rolling bearing is formed by a grooved ball bearing in which balls roll on ball grooves of the outer ring and of the spindle nut. Furthermore, however, this arrangement ensures that that region of the radial flange which projects radially inwards into the orifice of the housing is not supported. This structural arrangement, then, may additionally be utilized in so far as the radial flange is designed to be elastically deformable. This is because tilting movements of the outer ring about the spindle axis may then be possible. Tilting movements, may, for example, prevent the ball-rolling spindle from being warped with respect to the rolling bearing. Such warpings may lead to the failure of the rolling bearing. Such tilting movements may, however, also compensate thermal expansions. If, for example, a ball screw mechanism according to the invention is used as steering assistance for the rack-and-pinion steering system of a motor vehicle, steering assistances of this type may be exposed to pronounced temperature fluctuations which may easily amount to temperature differences of 100 degrees. According to the invention, the thermal expansions occurring in the event of this temperature difference can be satisfactorily compensated by means of a suitably deformably designed radial flange, without additional components being required.

The transmission of solid-borne sound may lead to the generation of noise which, for example, the driver of a motor vehicle feels to be disturbing. The noise source may be, for example, the ball screw mechanism. In a development according to the invention, the radial flange is fixed to the housing, with an element insulating solid-borne sound being interposed, without metallic contact between the radial flange and the housing taking place. For example, the radial flange may be provided with bores in which the element insulating solid-borne sound is arranged captively. This element insulating solid-borne sound may project beyond the radial flange on the end face on both sides. If, then, the radial flange is clamped between two components, as described, it is not end faces of the radial flange, but, instead, the projecting regions of the element insulating solid-borne sound, which come to bear against these two components, for example housing halves. This, on the one hand, ensures that the radial flange is fixed satisfactorily, and, at the same time, direct metallic contact between the radial flange and the housing is prevented.

Figure 5:
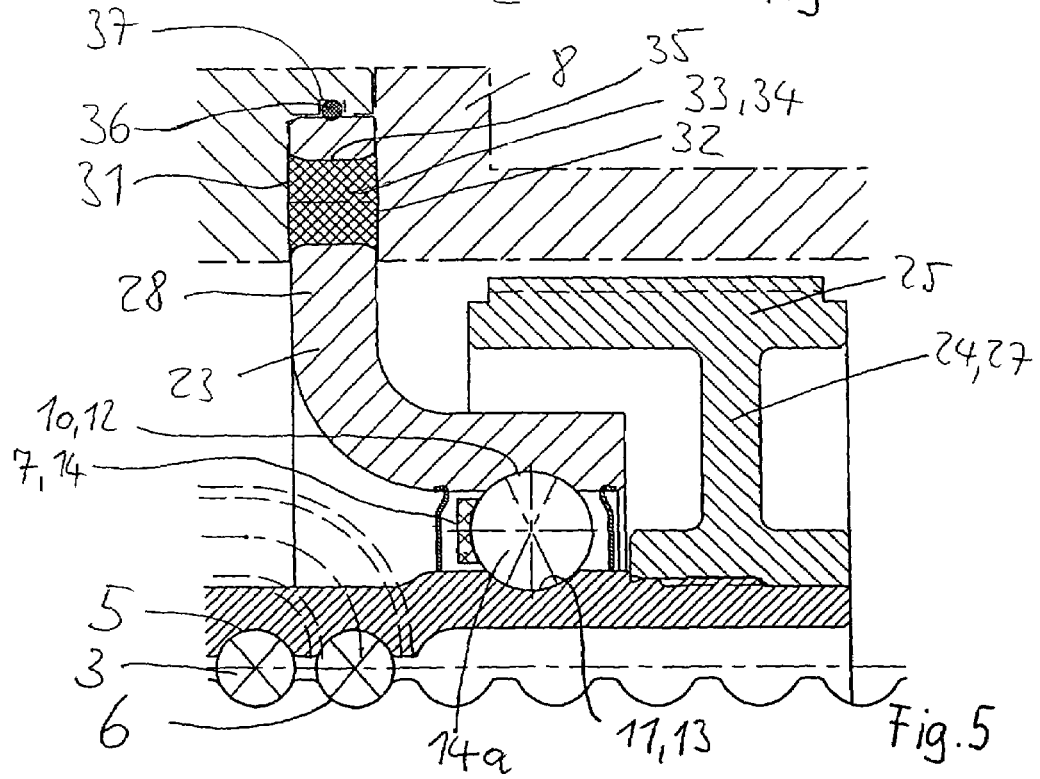

The invention is explained in more detail below by means of three exemplary embodiments depicted in a total of five figures in which:

FIG. 1 shows a longitudinal section through a ball screw mechanism according to the invention, FIG. 2 shows an axial top view of the ball screw mechanism according to FIG. 1, FIG. 3 shows a steering assistance for the rack-and-pinion steering system of a motor vehicle with a ball screw mechanism according to the invention, as shown in FIG. 1, FIG. 4 shows a partial longitudinal section through a further ball screw mechanism according to the invention, and FIG. 5 shows a further partial longitudinal section through a ball screw mechanism according to the invention.

DETAILED DESCRIPTION OF THE DRAWING

In the ball screw mechanism according to the invention, as shown in FIGS. 1 and 2, a spindle nut 1 is mounted rotatably on a ball-rolling spindle 2 via balls 3. The balls 3 roll around in a known way in endless ball channels 4. The balls 3 roll on ball grooves 5, 6 of the spindle nut 1 and of the ball-rolling spindle 2.

The spindle nut 1 is mounted axially and radially on a housing 8 via a rolling bearing 7, the housing 8 being merely hinted at in FIG. 1. This housing 8 surrounds the complete ball screw mechanism, as also described further below in further exemplary embodiments.

The rolling bearing 7 comprises an outer ring 9 which surrounds the spindle nut 1. The outer ring 9 and the spindle nut 1 are provided on circumferential surfaces facing one another with bearing running surfaces 10, 11 which in the present case are designed as ball grooves 12, 13 integrally formed in one piece onto the spindle nut 1 and the outer ring 9. The rolling bearing 7 consequently forms a grooved ball bearing 14.

The outer ring 9 has an approximately L-shaped design, as seen in longitudinal section. The outer ring 9 comprises a ring 15 which surrounds the spindle nut 1 and which is arranged coaxially to the spindle axis. Furthermore, the outer ring 9 comprises a radial flange 16 which extends radially outwards essentially transversely with respect to the spindle axis. The ring and the radial flange are connected in one piece to one another. This outer ring 9 is formed from sheet metal by the deep-drawing method. The radial flange 16 has a plurality of threaded bores 17 arranged so as to be distributed over the circumference, and a concavely shaped clearance 18 for the satisfactory setting of the rotary position of the outer ring 9 in the housing 8. The threaded bores 17 are arranged on a radially outer edge 19 of the radial flange 16. The housing 8 is provided with passage orifices, not depicted any further here, for leading through threaded screws, likewise not depicted, in order to screw the radial flange 16 to the housing 8. This ensures that the grooved ball bearing 14 and therefore the spindle nut 1 are mounted axially and radially on the housing 8.

A driving wheel 20 is arranged fixedly in terms of rotation on the spindle nut 1. This driving wheel 20 is formed in the present case by a toothed-belt disc 21. The toothed-belt disc 21 has looped around it a toothed belt, not depicted here, which is provided for driving the spindle nut 1.

FIG. 3 shows a steering assistance for the rack-and-pinion steering system of a motor vehicle. A rack 22 is designed in axial prolongation as a ball-rolling spindle 2. The above-described ball screw mechanism is arranged on the ball-rolling spindle 2.

The ball screw mechanism according to the invention, depicted in FIG. 4, differs from the ball screw mechanism described in FIGS. 1 to 3 in a modified outer ring 23 and a different arrangement of the grooved ball bearing 14, a modified driving wheel 24 being used.

The driving wheel 24 comprises a driving rim 25 around which a toothed belt, not depicted here, is looped. This driving rim 25 is connected via a flange 27 to a driving hub 26 arranged fixedly in terms of rotation on the spindle nut 1. The driving hub 26 and the driving rim 25 are flush with one another in one axial direction. Towards the other axial direction, the driving rim 25 projects markedly beyond the driving hub 26. The grooved ball bearing 14 is arranged within this projecting region.

The outer ring 23 is produced from sheet metal by the deep-drawing method and likewise has an L-shaped form, as seen in longitudinal section. A radial flange 28 is fixed to the housing 8. A ring 29 integrally formed in one piece onto the radial flange 28 surrounds the spindle nut 1 and is provided on its inner circumference with the ball groove 12. The radial flange 28 is clamped with its radially outer edge 30 between two housing halves of the housing 8. This ensures that the grooved ball bearing 14 and therefore the spindle nut 1 are fixed axially and radially. It may gathered from FIG. 4 that the housing halves have clamping surfaces 31, 32 between which the edge 30 is clamped. The radial flange 28 is in the present case sufficiently elastically deformable to ensure that, for example, thermal expansions can be compensated by means of a corresponding elastic deflection of the radial flange 28.

It may be gathered, furthermore, from FIG. 4 that the outside diameter of the radial flange 28 is larger than the outside diameter of the driving wheel 24. This advantageously makes it possible that the ball screw mechanism can be introduced into one housing half until the radial flange 28 comes to bear with its edge 30 against the clamping surface 32 of the housing half of the housing 8. The second housing half of the housing 8 can then be put in place, the clamping surface 31 being pressed against the edge 30 of the radial flange 28.

The ball screw mechanism according to the invention, depicted in FIG. 5, differs from that of FIG. 4 merely in that direct metallic contact between the outer ring 23 and the housing 8 is avoided by means of structural measures. This is achieved, in the present case, in that elements 33 insulating solid-borne sound are fastened to the radial flange 28 at a plurality of points arranged so as to be distributed over the circumference and come to bear against the clamping surfaces 31, 32 of the housing halves of the housing 8. The element 33 insulating solid-borne sound is formed in the present case by rubber inserts 34 which are inserted in bores 35 of the radial flange 28. When the radial flange 28 is not clamped, these rubber inserts 34 project beyond the radial flange 28 on both end faces of the latter. Whilst these rubber inserts 34 prevent direct metallic contact in axial directions, a rubber ring 36 ensures in the radial direction that the radial flange 28 is not in direct metallic contact with the housing 8. The rubber ring 36 is inserted into an annular slot 37 of the housing 8. The radial flange 28 comes to bear with its circumferential surface against the rubber ring 36.

The two ball screw mechanisms according to the invention, depicted in FIGS. 4 and 5, have the advantage that the active plane of a radial force component which is transmitted from the belt, not illustrated, to the driving wheel 24 is arranged at only a slight axial distance from the grooved ball bearing 14. This means that tilting moments acting on the grooved ball bearing 14 are reduced. The reduction in the tilting moment becomes possible due to the outer ring 23 of the grooved ball bearing 14 being designed according to the invention.

LIST OF REFERENCE NUMERALS

1 Clamping nut
2 Ball-rolling spindle
3 Ball
4 Ball channel
5 Ball groove

6 Ball groove
7 Rolling bearing
8 Housing
9 Outer ring
10 Bearing running surface
11 Bearing running surface
12 Ball groove
13 Ball groove
14 Grooved ball bearing
14a Ball
15 Ring
16 Radial flange
17 Threaded bore
18 Clearance
19 Edge
20 Driving wheel
21 Toothed-belt disc
22 Rack
23 Outer ring
24 Driving wheel
25 Driving rim
26 Driving hub
27 Flange
28 Radial flange
29 Ring
30 Edge
31 Clamping surface
32 Clamping surface
33 Element insulating solid-borne sound
34 Rubber insert
35 Bore
36 Rubber ring
37 Annular slot

The invention claimed is:

1. A ball screw mechanism, comprising:
    a spindle nut that has grooves for accommodating balls which run in the grooves to rotatably support the spindle nut on a ball rolling spindle;
    a driving wheel that is rotationally locked to the spindle nut so that a rotation imparted to the driving wheel also rotates the spindle nut;
    a bearing for accommodating the spindle nut, the bearing comprising an outer ring configured to be axially fixed to a housing without the need for an additional ring to axially fix the outer ring to the housing, wherein the outer ring comprises
    an annular ring having an inner circumference that circumscribes the spindle nut so as to extend over less than half of an axial length of the spindle nut;
    a bearing running surface formed on the inner circumference of said annular ring, and
    a radial flange adjoining the annular ring, the radial flange being capable of being fixed to the housing wherein, the driving wheel is configured to be driven by a traction mechanism, and the bearing running surface is arranged axially within the driving wheel.

2. A ball screw mechanism according to claim 1, in which the outer ring has an L-shaped form, as seen in longitudinal section, and the radial flange adjoins an axial end of the ring.

3. A ball screw mechanism according to claim 1, in which the radial flange and annular ring are integrally formed together as one continuous piece.

4. A ball screw mechanism according to claim 1, in which the outer ring is deep drawn from sheet metal.

5. A ball screw mechanism according to claim 1, in which the radial flange is arranged so as to be axially offset with respect to the bearing running surface.

6. A ball screw mechanism according to claim 1, in which the driving wheel overlies the bearing running surface.

7. A ball screw mechanism according to claim 1, in which the spindle nut is provided on its outer circumference with a bearing running surface which is integrally formed in one piece and which cooperates with the bearing running surface of the outer ring to mutually accommodate rolling bodies therebetween.

8. A ball screw mechanism according to claim 1, in which the radial flange has an outside diameter which is larger than the outside diameter of the driving wheel.

9. A ball screw mechanism according to claim 1, in which the radial flange has an edge and the radial flange is elastically deformable so as to permit tilting movements of the outer ring about the spindle axis when the edge of the radial flange is clamped into position.

10. A ball screw mechanism according to claim 1, in which the radial flange is provided with a solid sound-proofing material between the radial flange and the housing.

11. A ball screw mechanism according to claim 1, wherein the traction mechanism is a toothed belt.

* * * * *